United States Patent [19]

Di Leo

[11] Patent Number: 4,851,132

[45] Date of Patent: Jul. 25, 1989

[54] FILTERING CASE FOR SEPARATING A LIQUID FROM A SOLID, IN PARTICULAR FOR DEHYDRATING SLURRIES FROM INDUSTRIAL PROCESSES

[75] Inventor: Vincenzo Di Leo, Milan, Italy

[73] Assignee: Cameron Iron Works USA, Inc., Houston, Tex.

[21] Appl. No.: 185,129

[22] Filed: Apr. 22, 1988

Related U.S. Application Data

[60] Continuation of Ser. No. 95,418, Sep. 10, 1987, abandoned, which is a division of Ser. No. 2,658, Dec. 18, 1986, Pat. No. 4,714,549.

[51] Int. Cl.[4] ........................ B01D 33/00; B01D 35/28

[52] U.S. Cl. .................................... 210/770; 100/127; 210/224; 210/350

[58] Field of Search ............... 100/127, 194, 195, 199, 100/203, 206, 240, 246, 251, 252, 253, 211, 269 A, 265; 210/224, 342, 350, 267, 268, 767, 768, 770, 769

[56] References Cited

U.S. PATENT DOCUMENTS

| | | | |
|---|---|---|---|
| 651,805 | 6/1900 | Kempf | 100/127 |
| 2,800,072 | 7/1957 | Vandenburgh | 100/127 |
| 3,410,202 | 11/1968 | Chrubasik | 100/269 A |
| 4,019,984 | 4/1977 | Mohn | 100/127 |

FOREIGN PATENT DOCUMENTS

| | | |
|---|---|---|
| 319156 | 9/1920 | Fed. Rep. of Germany . |
| 1627836 | 1/1967 | Fed. Rep. of Germany . |
| 979016 | 4/1951 | France . |

*Primary Examiner*—Frank Sever

[57] ABSTRACT

A filtering case (1,30) is comprised of two superimposed parts, respectively an upper one (2,31) and a lower one (43, 32), which slide telescopically the one within the other. The upper part (2,31) bounds a slurry receiver chamber (**2*a*,51) and has an apertured (4,51) bottom wall (8,40*a*); the lower part (3,32) is guided through the aperture (4,61) between a first position outside the slurry receiver chamber (2*a*,51) and a second position at least partway inserted thereinto. The lower part (3,32) has fiter-forming side walls whereby the overall filtering area of the case (1,30) increases with the depth of penetration of the lower part (3,32) into the slurry receiver chamber (2*a*, 51**).

5 Claims, 5 Drawing Sheets

FILTERING CASE FOR SEPARATING A LIQUID FROM A SOLID, IN PARTICULAR FOR DEHYDRATING SLURRIES FROM INDUSTRIAL PROCESSES

RELATED APPLICATIONS

This application is a continuation of Ser. No. 07/095,418, filed Sept. 10, 1987, now abandoned which is a division of prior application Ser. No. 07/002,658, filed Dec. 18, 1986, now U.S. Pat. No. 4,714,549 which is the national phase of PCT Patent Application No. PCT/EP86/00253, filed Apr. 24, 1986, which is based on Italian Patent Application Serial No. 20581 A/85, filed Apr. 29, 1985 and Italian Patent Application Serial No. 19016 A/86, filed Jan. 7, 1986.

TECHNICAL FIELD

The present invention has for its subject a filtering case having rigid filter-forming walls for separating a liquid from a solid, in particular for dehydrating slurries from industrial processes.

To conveniently handle such slurries, specifically to make their transportation and disposal easier and more economical, it is necessary that their relative humidity be reduced as far as possible.

BACKGROUND ART

It is known to separate the solid component of slurries or sewage from the liquid by means of filtering cases, with a filter cloth across their walls, wherein the solid is separated from the liquid by gravity. A case of this kind is disclosed, for example, in Italian patent application No. 21480-B/84.

Dehydration by gravity filtration, which takes place along with natural evaporation of the water contained in a slurry being processed, requires, however, a fairly long time. As an example, in cold damp weather, processing time and/or the attainable results may be unsatisfactory.

To shorten the dehydration time, it has been thought of subjecting a slurry being processed to a pressure, by superimposing a number of cases on one another.

However, that approach has shown to be hardly practicable or even wholly unpracticable because the pressure on the slurry, due to the weight of the stacked cases, reduces itself at most to few marginal areas, to merely produce, if any, a slightly increased initial dehydration, or to concentrate over a central area of the cases, placed the one within another, producing slurry leakage past the case peripheral rims.

Dehydration time has been successfully reduced by stacking together filtering cases having flexible walls, such as filter bags.

In this instance, the effect of stacked bags is that an improved distribution of pressure is brought about, and hence, a higher rate of slurry dehydration without causing it to leak out or drop out.

Flexible wall cases require, however, some auxiliary means of supporting them in the stacked arrangement, and are more difficult to manipulate and handle.

The problem underlying the present invention is to provide a filter case of the rigid type which affords a faster rate of dehydration of civil and industrial slurries, while obviating all the drawbacks which affect the cited prior art.

DISCLOSURE OF INVENTION

This problem is solved by the invention through a filtering case of the aforesaid type being characterized in that it comprises tow superimposed parts, respectively an upper one and a lower one being movable the one relatively to the other, the upper part bounding a slurry receiver chamber and having a bottom wall wherethrough an opening is formed, the lower part being guided through said opening between a first position outside said chamber and a second position at least in part inserted into said chamber.

Thus, in a case of this type, the lower part will act as a plunger in relation to the contents of the upper part which bears with its weight and the overlying one on the lower part through the intervening body of a slurry to be dehydrated.

Advantageously, the lower part would be configured as a drum and have side walls which form filtering surfaces.

Thus, the overall filtering surface area of the case is made to increase as the lower part penetrates the slurry receiver chamber.

In a preferred embodiment of this invention, the case walls are of mesh, metal grid, or perforated sheet metal construction, and the slurries collect in a filter bag or cloth placed within the slurry receiver chamber. The size of the opening through the bottom wall of the upper art is selected to make the filter bag or cloth to take, in the gap between the upper and lower parts, a pocket-like conformation as the relative movement of the two parts proceeds, to contribute its filtering action without hindering the relative movement of the parts. The arrangement of the cloth inside the upper part of the case in the course of the dehydration process is such as to prevent spillage of slurry or sewage despite the pressure from the lower part being applied continuously.

A rigid type case as proposed by this invention, in addition to speeding up the dehydrating action, is easily transported and handled and may be provided, for example, with lifting handles and designed for convenient and stable stacking of several cases.

It has been found that with a case according to the invention, dehydration time may be reduced by over 50% for a given mass of the processed slurry.

BRIEF DESCRIPTION OF DRAWINGS

The invention features and advantages will be more clearly apparent from the following detailed description of two preferred but not exclusive embodiments thereof, with reference to the accompanying drawings, where.

MODES FOR CARRYING OUT THE INVENTION

Figure 1:
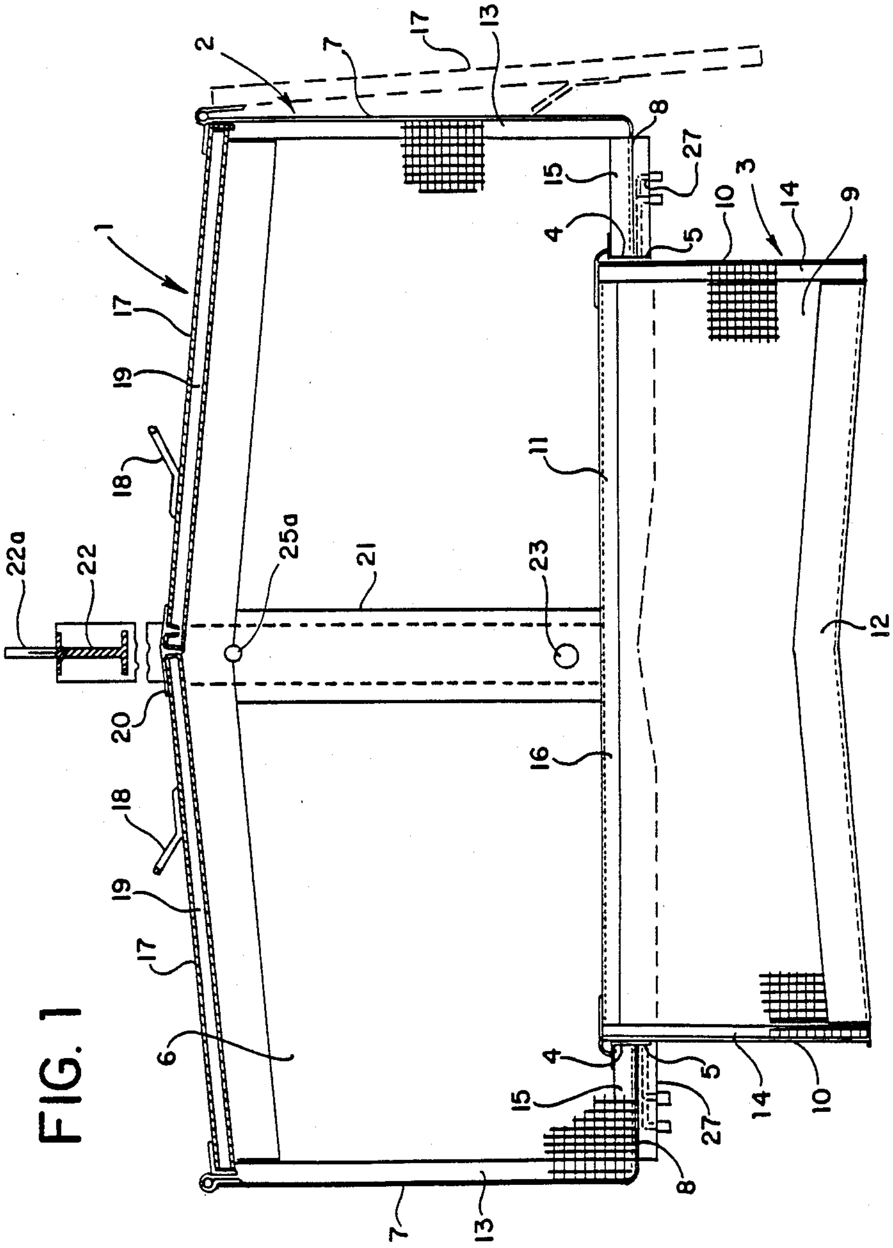
FIG. 1 is a sectional view of a case according to this invention, taken on a longitudinal vertical plane.

With reference to FIGS. 1 to 5, a case 1 for separating a liquid from a solid, according to the invention and particularly but not exclusively intended for dehydrating industrial slurries such as slurries from marble working, comprises two superimposed parts 2,3 which are movable telescopically relative to each other. The parts 2,3 have preferably parallelepipedic shapes.

The upper part 2 has in plan view larger dimensions than the lower part 3, it being appreciably longer and wider. Formed in its bottom wall is a central opening 4 wherethrough the lower part 3 is allowed to slide, e.g. guided by angle members 5 attached to the upper part 2 at the opening 4. Inside the upper part 2 there is bounded a chamber 2*a* adapted to receive slurries or sewage for processing.

The side walls 6 and 7, and the bottom portions 8 of the upper part 2 are constructed of either mesh, metal grid, or perforated sheet metal, as only partly shown.

The side walls 9 and 10 and the top wall 11 of the lower part 3 of the case 1 are also formed from either mesh, metal grid, or perforated sheet metal.

The part 3 is instead open at the bottom and bounded by angle members which define, along two sides 12, a roof-like setting.

Also shown in the drawing are the framing members for the two parts, generally indicated at 13, 14, 15 and 16, which are formed by angle members or bars connected together and to the respective case walls.

The upper part 2 may be closed by a cover with two tilting doors 17 which are hinged to the walls 7 and fitted with opening handles 18. With the cover shut, the top portion of the part 2 takes a roof-like setting conforming with the angle members 12, thereby several cases 1 can be stacked upon one another in a stable fashion.

The two doors 17 of the cover are each formed of two discrete filtering walls defining an aeration chamber 19 therebetween. The doors may be locked by means of a closure 20.

The upper part 2 is pivoted at opposite walls to a suspension bracket having two arms 21 fast with a suspension cross-piece 22 which can be hooked, by means of hooking elements 22*a*, to some transportation facility or the like for transporting the case 1. The pivot point lies in the bottom zone of the part 2, on an axis indicated schematically at 23.

Locking devices generally indicated at 24 and comprising, for example, pegs 25 carried on the arms 21 and being inserted removably through openings 25*a* in the longitudinal walls 6 of the part 2 enable, if required, the part 2 to be blocked rotatively with respect to the supporting system comprises of the arms 21 and the cross-piece 22. In the unlocked condition, that is with the pegs 25 not inserted through the opening 25*a*, the case 1 can be tilted about the axis 23 while being held suspended from the supporting system 21,22.

Figure 2:
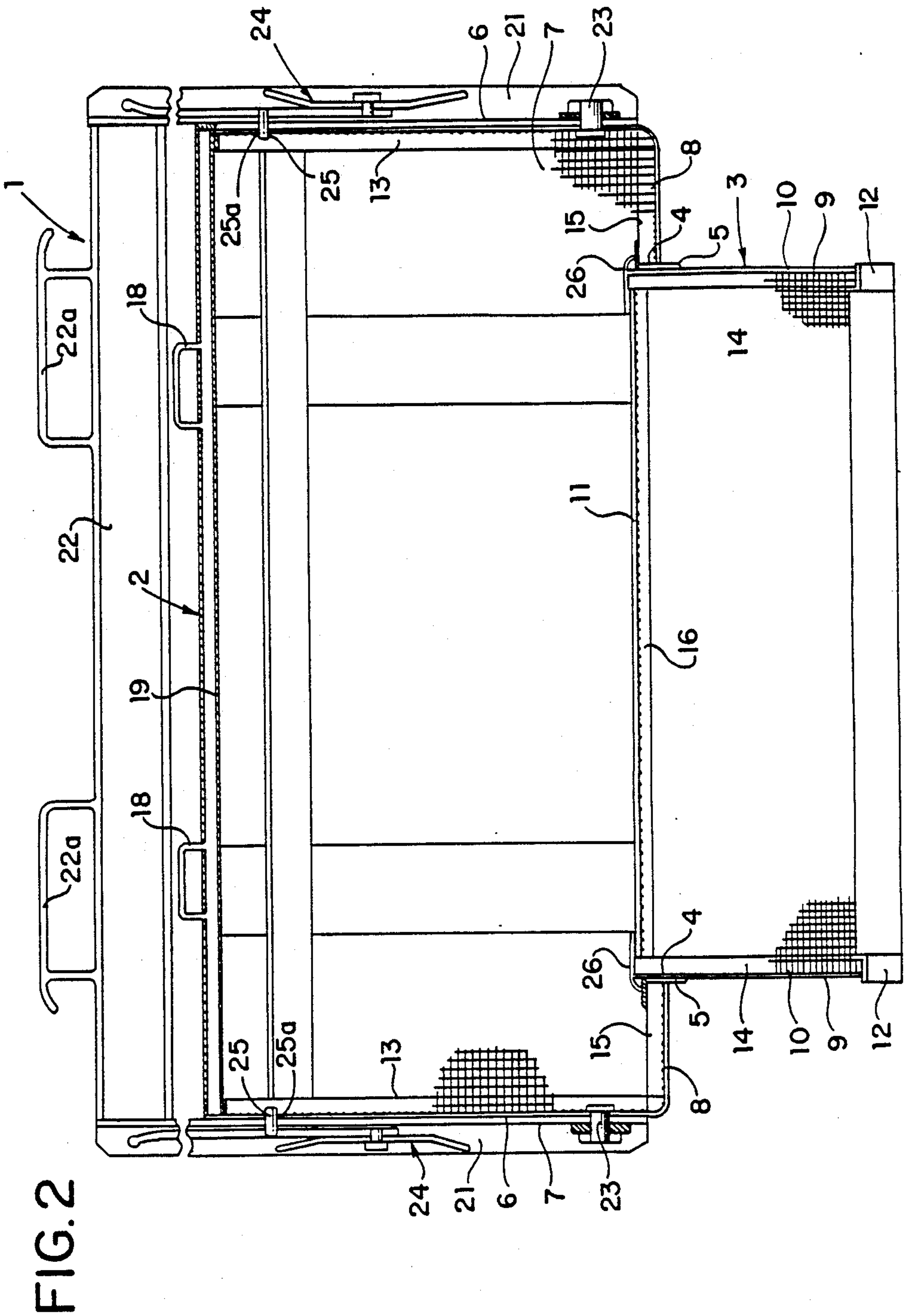
FIG. 2 is a sectional view of the case of FIG. 1, taken on a vertical cross-centerplane.
Figure 3:
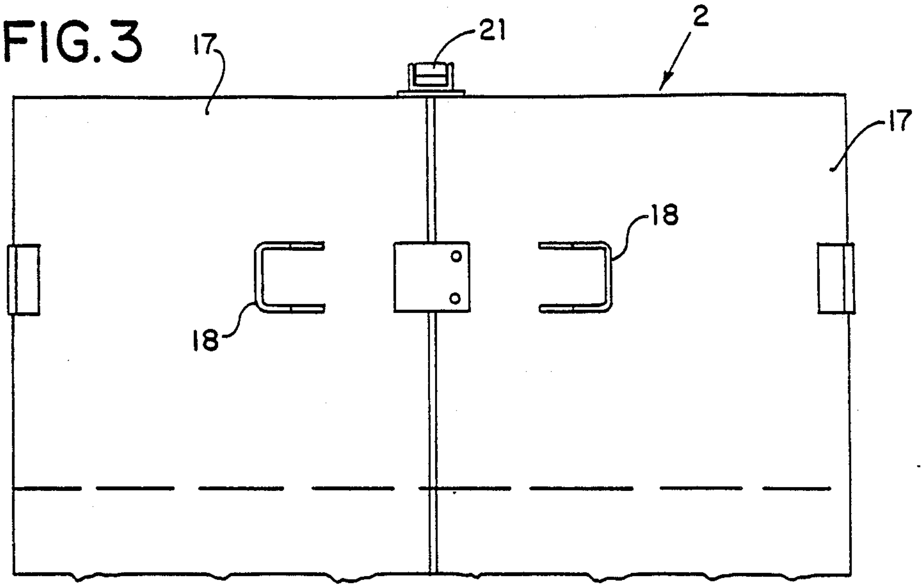
FIG. 3 is a fragmentary plan view of the case shown in the preceding figures.

Attached to the top 11 of the lower part 3 are plate-like travel end elements adapted to interfere with the angle members 5 in the fully extended position of the two parts 2,3 of the case 1 as shown in FIGS. 1 and 2.

Also provided is a locking means 27, of the latch type, for locking the two parts 2,3 of the case 1 to each other in their fully extended position.

The interior of the upper part 2 of the case 1 accommodates a filter cloth or bag 28 (FIG. 4) known per se, whereby the walls of both parts 2,3 of the case 1 are filtering capability.

The filter cloth is effective to hold back the solid particles in slurries being processed, letting the liquid phase therethrough.

In use, after the filter cloth 28 has been installed, and the case 1 loaded with a slurry for processing inside the cloth 28, normal filtration by gravity will occur. The filtrate collects in a tank 29.

By acting on the locking means 27 so as to unlock the two parts 2,3 and lying a second case 1 on top of the first after tilting the arms 21 and cross-piece 22 (FIG. 4), the weight of the second case 1 will cause the underlying case 1 to move down with a consequent plunger-like action of the lower part 3 in relation to the filter cloth 28 and the slurry contained therein. The greater the weight bearing on the underlying case, the stronger the compressive action on the slurries contained therein. It may be appreciated that the natural dehydration action by gravity is significantly enhanced by this compression.

Figure 5:
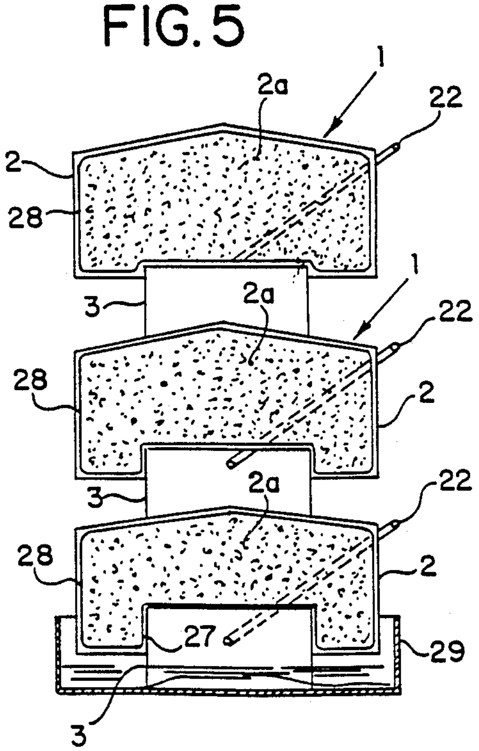
FIG. 5 is a diagramatic view similar to FIG. 4, during a subsequent stage of the dehydration process.
Figure 6:
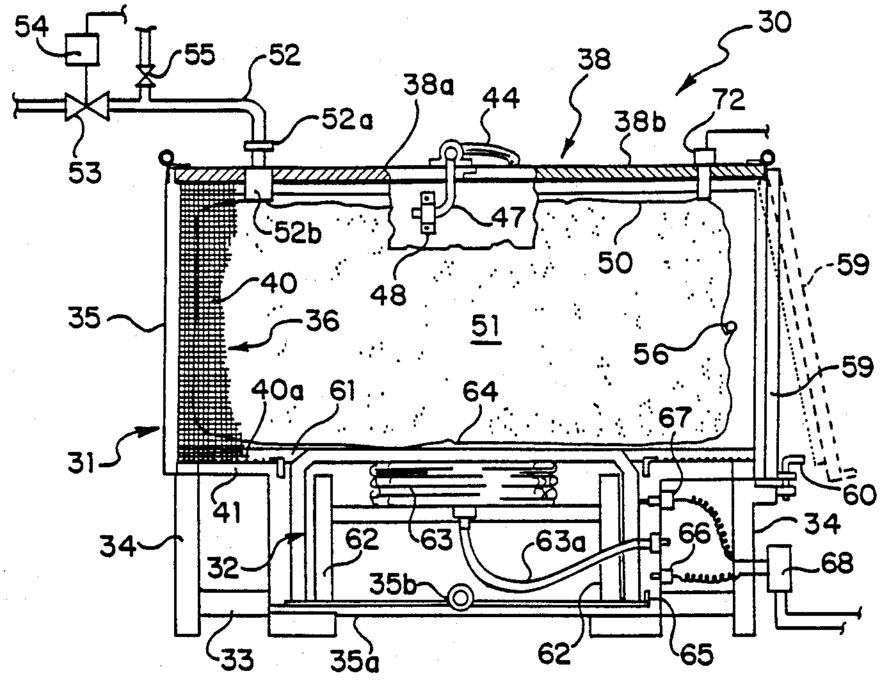
FIG. 6 is a diagramatic view, partially in longitudinal section, of a modified embodiment of the case according to the invention, as adapted for processing low dry substance content slurries, shown at a first operating step.
Figure 7:
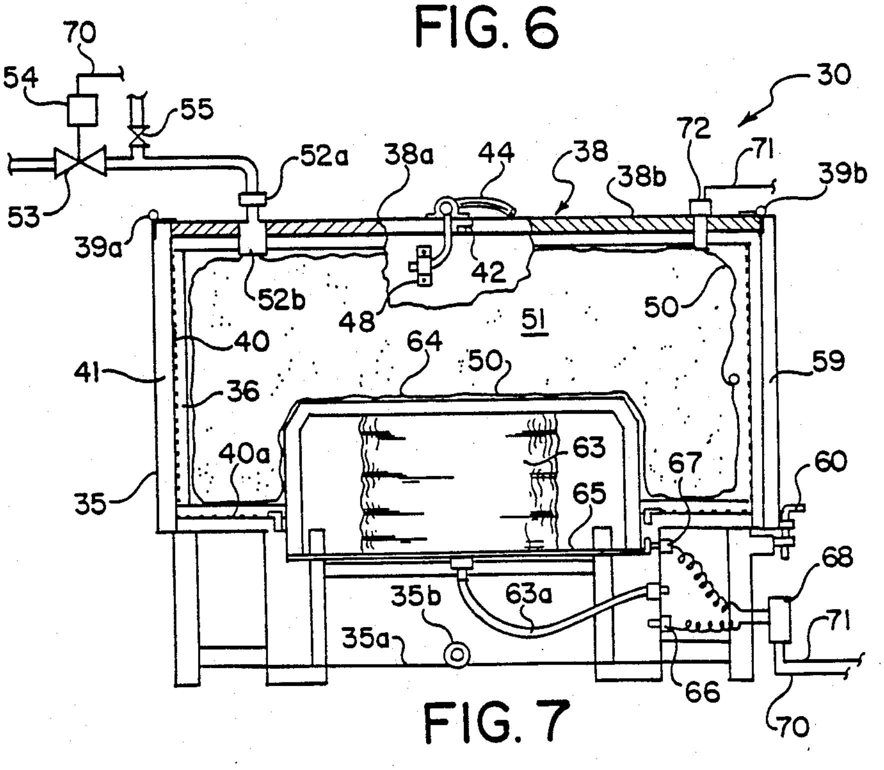
FIG. 7 is a longitudinal section view showing diagramatically the case of the FIG. 6 at a second operating step thereof.
Figure 8:
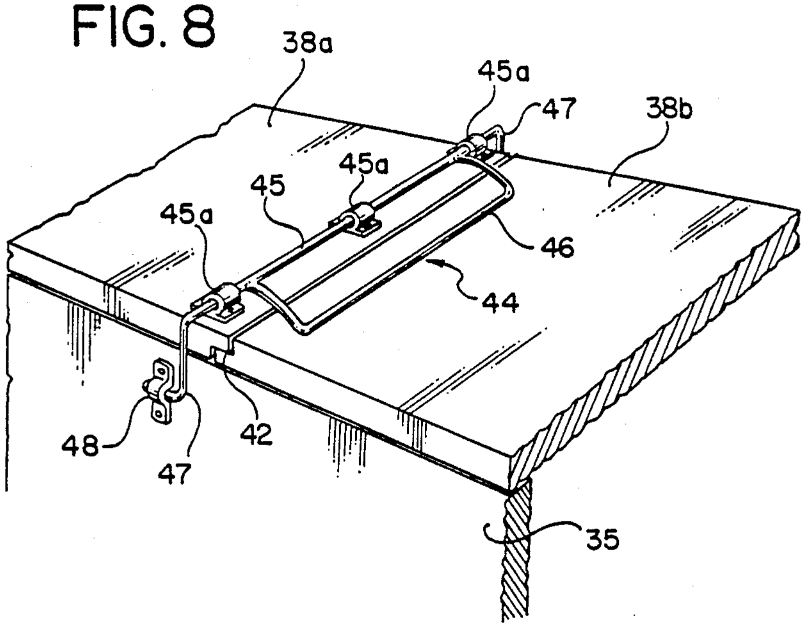
FIG. 8 is a fragmentary perspective view of the upper part of the case of FIGS. 6 and 7.
Figure 9:
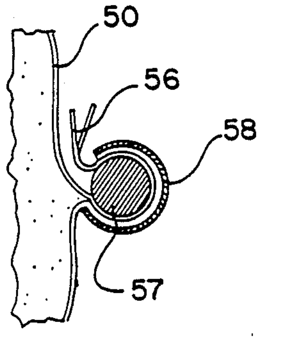
FIG. 9 is an enlarged scale sectional view of a detail of the case of FIG. 6.

The compressive action from the top 11 of the part 3 on the bottom zone of the cloth 28, as well as the weight of the material contained, cause the cloth 28 to take progressively a pocket-like conformation at those portions of the bottom wall 8 of the part 2 which extend around the opening 4 (FIG. 5). It has been found that a dimension of about 20 cm for the section of the bottom wall 8 of the part 2 exceeding the top 11 of the part 3 is adequate to ensure proper setting of the cloth 28, while avoiding jamming and penetration of the cloth 28 in between the moving parts 2,3.

It may be seen that no spilled slurry is to be feared, because of the cloth 28 completely surrounding the slurry receiver chamber 2*a* and being in turn confined by the metal grid or mesh walls of the case 1.

It should be further noted that no stagnant pockets of liquid form during dehydration.

As the lower part 3 moves from a first position outside the chamber 2*a*, with the top 11 level with the bottom wall of the upper part, to a second position inserted into the chamber 2*a*, there occurs a gradual increase of the filtering surface. That increase is due to the filtering effect of those portions of the side walls 9 and 10 of the part 3 which are pushed gradually into the chamber 2*a*.

The structure disclosed lends itself advantageously to separating solids from liquids by reciprocation at a relatively low rate and relatively large amplitude, as described in patent application of industrial invention No. 22669-A/84.

In FIGS. 6 to 9, there is shown a case 30, according to a variant of this invention, which is specially designed for processing low dry substance content (on the order of 2-6% by weight of dry substance) slurries.

With this variant, a method will be also described for filtering civil and industrial slurries having a low-to-medium dry substance content and also forming the subject of this invention.

That method has been devised in order to increase the amount of the slurry processed with respect to the capacity of a single case so as to obtain an appreciably increased slurry solid residue which remains in the case following filtering. This affords, with particularly wet slurries, increased slurry dehydration, thereby the following transportation and disposing steps are made profitable.

The method of this invention consists of subjecting the case to cyclic volume increases and decreases and of topping up the case concurrently with the volume increase cycles.

Such cyclic increases and decreases of the case volume are attained by a telescoping movement of one part of the case to and from the remaining case part. The container 30 is formed of two superimposed parts 31 and 32 of parallelepipedic shape.

The part 31 is mounted on top of a frame 33 with legs 34 located at the vertices and comprises an outer impervious tank 35 and an inner tank 36 with filtering walls 40, accommodated in the tank 35.

Between the tank 35 and the tank 36, there is defined an interspace 41 for passing the filtrate therethrough.

The two tanks 35 and 36 are removably closed at the top by a cover 38 with two doors 38*a*, 38*b* hinged to the tank 35 at the short sides 39*a*,39*b* thereof.

The doors 38*a*,38*b* have frontally a mating surface shaped to form an abutment 42 of the one on the other.

Also provided is a locking device 44 for locking the cover 38 in the closed position. The device 44 comprises a rod 45 engaged rotatably in bushes 45*a* fast with the door 38*a*, a strengthening element 46 fast with the rod 45 and pushing, with the device 44 in the locked position of the cover 38, on the remaining door 38b and two sections 47 at the juxtaposed ends of the rod-like section 45, the sections 47 being bent into hooks for engagement with corresponding slots 48 attached laterally of the walls of the inner tank 35.

The strengthening element 46 forms a handle for opening and closing the locking device 44.

In the example shown, the interior of the tank 35 accommodates removably a cloth or bag 50 of a previous material to the liquid fraction of the slurries to be processed but adapted to hold back its solid fraction. In this example, the walls 40 of the tank 36 are formed from metal grid or mesh the filtering function proper being entrusted to the bag 50. Alternatively, it is contemplated that the walls themselves may be lagged with a suitable conventional filter material.

Within the tank 36 and the bag 50 there is defined a receiver chamber 51 for the slurries to be processed.

The chamber 51 is fed through a conduit 52. The conduit 52 is connected by a quick-connection coupling 52*a* to a sleeve 52*b* extending through the cover 38 and communicating with the interior of the bag 50.

On the conduit 52 there is a cut-off valve 52 driven by an actuator 54 and a bleed valve 55.

Figure 4:
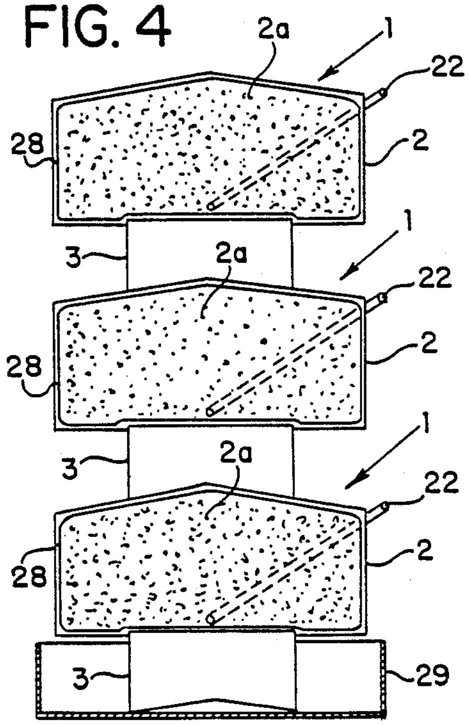
FIG. 4 is a diagramatic, reduced scale view of some stacked cases at the start of the dehydration operation.

One end of the bag 50 is closed removably by folding its flaps 56 around a rigid rod 57 and force fitting over the flaps 56 and rod 57 a cylindrical sleeve 58 split along a generatrix line (FIG. 4).

At that end of the bag 50, the tanks 35 and 36 have a wall forming an openable door 59, held normally in a shut position by latches 60.

Through the bottom wall 40*a* of the inner tank 36 there is formed an opening 61 wherethrough the lower part 32 of the case 30 is movable to and from the chamber 51.

At the part 32, the outer tank 35 has a well-like conformation around said part 32.

Such conformation enables several cases 30 to be stacked upon one another without interference between the well 35*a* of the overlying case and the conduit 52 associated with the underlying case 30. At the bottom of the well 35*a* there is a stopper 35*b* for draining the filtrate out.

The part 32 has previous walls to the liquid fraction of the slurries to be processed, e.g. formed from mesh, metal grid, or perforated sheet metal. It has the form of an open bottom drum and is guided in its telescoping movement relatively to the part 31 on angle elements 62 rigid with the frame 33.

Motive means, formed in the example shown by a pneumatically inflatable cylinder 63 through a pipe 63*a*, are interposed to the frame 33 and the part 32.

The cylinder 63 is arranged to move the part 32 cyclically, as explained hereinafter, between a first position (FIG. 1) where the upper part 64 thereof is located level with the bottom 40*a* of the tank 36 and a second position (FIG. 2) where the part 32 is partly received within the tank 36 to push on the bag 50. This brings about a change in the volume of the chamber 51.

Fast with the bottom of the part 32 is a travel indicator 65 cooperating with first and second travel limit switches respectively indicated at 66 and 67, in turn fast with the part 31 of the case 30. The travel limit switches 66 and 67 are positioned to detect movement of the travel indicator 65 shortly part the first position (in the upward direction of travel of the part 32 inside the chamber 51) and at the second position of said part 32. They are both connected to a unit 68. The travel indicator 65 and the travel limit switches 66,67 form means of sensing the relative movement of the parts 31,32 of the case 30.

Also connected to the unit 68, through cables schematically indicated at 70 and 71, respectively, the actuator 54 for the valve 53 and a probe 72 located on the cover 38 in the proximity of one of the short sides 39*a*,*b* thereof.

The probe 72 is adapted to sense filling of the chamber 51.

The unit 68 comprises a timer, not shown, associated with operative signals from the probe 72 and the travel limit switches 66,67 as explained hereinafter.

According to the method of this invention, a slurry to be processed is introduced into the chamber 51 of the case 30 until the bag 50 is filled up.

During this stage, the cover 38 and the door 59 are locked in their closed positions.

Filling of the chamber 51 is sensed by the probe 72 with the supply of an electric signal to the unit 68.

On reaching this condition, through the unit 68, the actuator 54 is activated to close the valve 52 and cut off the conduit 52.

Concurrently therewith, the supply of pressurized air to the cylinder 63 is activated to drive the part 32 upwards toward the interior of the chamber 51. The part 32 moves from the first position of FIG. 1 to the second position shown in FIG. 2. The chamber 51 is subjected to a volume decrease with deformation of the bag 50 and compression of the slurries contained therein.

It should be noted that the telescoping insertion of the part 32 toward the interior of the part 31 improves the filtering ability of the case 30; directly, where said parts have walls of a filtering material, with elimination of the bag 50, there occurs an increase of the active filtering surface as the part 32 is pushed into the chamber 51. In any case, the solid phase of the slurries contained in that chamber is budged.

Because of the slurry contained in the chamber 51 being compressed, there occurs first separation of the solid phase from the liquid phase; the liquid phase collects in the well 35*a*.

On the travel indicator 65 reaching the travel limit switch 67, that is with the part 32 in the second position shown in FIG. 2, the pressurized air is discharged from the cylinder 63 with return of the part 32 to the first position shown in FIG. 1.

Simultaneously therewith, through the unit 68, the valve 53 is reopened to top up the chamber 51 with fresh slurry.

The active stroke time of the part 32 is limited by the timer provided in the unit 68; that is, if the travel indicator 65 after moving past the travel limit switch 66 fails to reach the travel limit switch within a preset time interval, the pressurized air is discharged all the same from the cylinder 63 with return of the part 32 to the first position.

Also controlled by said timer is the time required by the part 32 to move from the first position (FIG. 1) to a position where the travel indicator 65 acts on the first travel limit switch 66.

If this time is longer than a preset value, the supply of compressed air to the cylinder 63 is cut off.

In this condition, filtering would be regarded as completed, with the case 30 filled up.

On reaching this condition, the conduit 52 is disconnected from the case 30 by separating the quick-connection coupling 52a. The case can be loaded and transported on a truck to the slurry disposal area or the filled bag 50 be taken out and replaced with a fresh empty bag 50.

Emptying of the case 30 may be carried out by either opening the cover 38 or opening the door 59 removing, in this case, the sleeve 58 and 57 from the flaps 56 of the bag 50.

It should be noted that the locking device 44 for the cover 38 acts as a stiffening element for said cover when in the closed position it is subjected to a pressure due to the part 32 moving from the first position to the second.

The most evident advantage of the method and the case of this invention is that processing and handling of low dry substance content industrial slurries is made easy and profitable. A further advantage specifically related to the case is that it can be stacked column-like, and that internal pressures are better resisted by the cover being strengthened. Furthermore, the case of this invention affords a fully automated filtering of industrial slurries.

Not least important is the fact that the relative movement of the case parts brings about a movement of the slurry solid phase, hindering their caking over the filtering walls.

I claim:

1. A method of filtering civil and industrial slurries within a filtering case (30), said method comprising:

providing means for enabling filtration area to increase from a first position to a second position, subjecting the case (30) to cyclic volume increases and decreases, and topping up the case (30) concurrently with said volume increases.

2. A method according to claim 1, characterized in that said cyclic volume increases and decreases of the case (30) are brought about by a telescoping movement of one part (32) of said case to and from the other part (31) of said case.

3. A method of filtering civil and industrial slurries within a filtering case (30) having a filtration area, said method comprising:

providing means for enabling filtration area to increase from a first position to a second position, subjecting the case (30) to cyclic volume increases and decreases increasing the filtration area when the volume of the case is decreased, and topping up the case (30) concurrently with said volume increases.

4. A method of filtering civil and industrial slurries, respectively, comprising:

providing a filtering case (30), respectively including two superimposed parts, respectively, an upper part (2, 31) and a lower part (3, 32) movable the one relative to the other, the upper part (2, 31) bounding a slurry receiver chamber (2*a*, 51) and having a bottom wall (8, 40*a*) including an opening (4, 61), and means for enabling guiding of the lower part (3, 32) through said opening (4, 61) between a first position outside said chamber (2*a*, 51) and a second position at least partially inserted into said chamber (2*a*, 51), and including means for enabling filtration area to increase from said first position to said second position, and then topping up the case (30) concurrently with said volume increases.

5. A method of filtering civil and industrial slurries, respectively, comprising:

providing a filtering case (30), respectively including two superimposed parts, respectively, an upper part (2, 31) and a lower part (3, 32) movable the one relative to the other, the upper part (2, 31) bounding a slurry receiver chamber (2*a*, 51) and having a bottom wall (8, 40*a*) including an opening (4, 61), and means for enabling guiding of the lower part (3, 32) through said opening (4, 61) between a first portion outside said chamber (2*a*, 51) and a second position at least partially inserted into said chamber (2*a*, 51), and including means for enabling filtration area to increase from said first position to said second position, and then subjecting the case (30) to cyclic volume increases and decreases increasing the filtration area when the volume of the case is decreased, and topping up the case (30) concurrently with said volume increases.

* * * * *

UNITED STATES PATENT AND TRADEMARK OFFICE

CERTIFICATE OF CORRECTION

PATENT NO. : 4,851,132

DATED : Jul. 25, 1989

INVENTOR(S) : Vincenzo Di Leo

It is certified that error appears in the above—identified patent and that said Letters Patent is hereby corrected as shown below:

The assignee listed at "[73]" on the face of the patent is incorrect. No assignee data should appear since the patent had not been assigned.

Signed and Sealed this

Twenty-ninth Day of May, 1990

*Attest:*

HARRY F. MANBECK, JR.

*Attesting Officer*

*Commissioner of Patents and Trademarks*

UNITED STATES PATENT AND TRADEMARK OFFICE

CERTIFICATE OF CORRECTION

PATENT NO. : 4,851,132

DATED : July 25, 1989

INVENTOR(S) : Vincenzo Di Leo

It is certified that error appears in the above—identified patent and that said Letters Patent is hereby corrected as shown below:

On the title page, under Related U.S. Application Data, Item 60, please add ", which claims priority under PCT/EP86/00253, Dec. 18, 1986."

Signed and Sealed this

Fourteenth Day of January, 1992

Attest:

HARRY F. MANBECK, JR.

Attesting Officer

Commissioner of Patents and Trademarks